United States Patent [19]

Massa

[11] Patent Number: 4,745,586
[45] Date of Patent: May 17, 1988

[54] ELECTROMAGNETIC TRANSDUCERS FOR UNDERWATER LOW-FREQUENCY HIGH-POWER USE

[75] Inventor: Frank Massa, Cohasset, Mass.

[73] Assignees: Fred M. Dellorfano, Jr.; Donald P. Massa, both of Cohasset, Mass.

[21] Appl. No.: 59,411

[22] Filed: Jun. 8, 1987

[51] Int. Cl.[4] .................. H04R 9/00; H04R 11/00
[52] U.S. Cl. .................................. 367/175; 367/174; 367/142
[58] Field of Search ............. 367/174, 175, 182, 142; 381/117, 192, 199, 200, 201, 203

[56] References Cited

U.S. PATENT DOCUMENTS

| | | | |
|---|---|---|---|
| 2,978,669 | 4/1961 | Harris | 367/175 |
| 3,993,973 | 11/1976 | Hutchins et al. | 367/174 |
| 4,584,438 | 4/1986 | Koenig | 381/203 |
| 4,660,186 | 4/1987 | Massa | 367/175 |

Primary Examiner—Charles T. Jordan
Assistant Examiner—John W. Eldred

[57] ABSTRACT

An electromagnetically driven vibratile piston underwater transducer element generates acoustic intensity levels in excess of 25 peak Watts per square inch of radiating surface in the low audible frequency region within the approximate range 500 to 2500 Hz. The design achieves an efficiency greater than 50% and a very low Q of less than 2. The electromagnetic design employs two separate independent air gaps and a unique mechanical coupling system that combines the electromechanical forces generated in each gap in the proper phase and transmits the combined oscillatory force to drive the vibratile piston.

18 Claims, 1 Drawing Sheet

ELECTROMAGNETIC TRANSDUCERS FOR UNDERWATER LOW-FREQUENCY HIGH-POWER USE

This invention is concerned with improvements in the design of underwater electromagnetic transducers for the generation of high intensity underwater sound in the frequency region below approximately 3 kHz. It is a continuation in part of my copending applications; Ser. No. 6/832,313, filed Feb. 24, 1986 (now U.S. Pat. No. 4,660,186 dated Apr. 21, 1987), and Ser. No. 6/940,669, filed Dec. 11, 1986.

The referenced copending Applications describe a vibratile piston which is driven by electromagnetic forces generated in an air gap established between the inner piston surface and an inertial mass. The magnitude of the air gap is controlled by a plurality of springs that are mounted between the inner piston peripheral surface and the inertial mass surface. The stiffness of the springs determines the resonance frequency of the transducer.

In the single air-gap magnetic structures used in the structural designs illustrated in the copending Applications, the springs will be statically deflected by the presence of the dc magnetic flux bias in the air gap and the amount of static deflection will be a function of the spring stiffness and the bias flux density.

It is an object of this invention to design a novel dual air-gap magnetic structure for driving the vibratile piston and also eliminate the static magnetic displacement of the air gap so that the air gap dimension is no longer dependent on the air gap flux density or on the stiffness of the springs.

Another object of the invention is to utilize the disclosed dual air-gap design as a "push-pull" electromagnetic force generating system to drive the vibratile piston and thereby improve the linearity of the piston displacement at high-power operating levels.

It is also another object of this invention to make possible the use of a smaller more efficient air-gap construction in the disclosed new transducer design by the elimination of the static air gap displacement which is inherent in the single air-gap configurations illustrated in the copending Applications.

Other objects of the invention will become more evident in the following detailed description of a preferred embodiment. The novel features which are characteristic of the invention are set forth with particularity in the appended claims. The invention itself, however, both as to its organization and method of operation, as well as advantages thereof, will best be understood from the following description of several embodiments thereof when read in connection with the accompanying drawings, in which:

Figure 1:
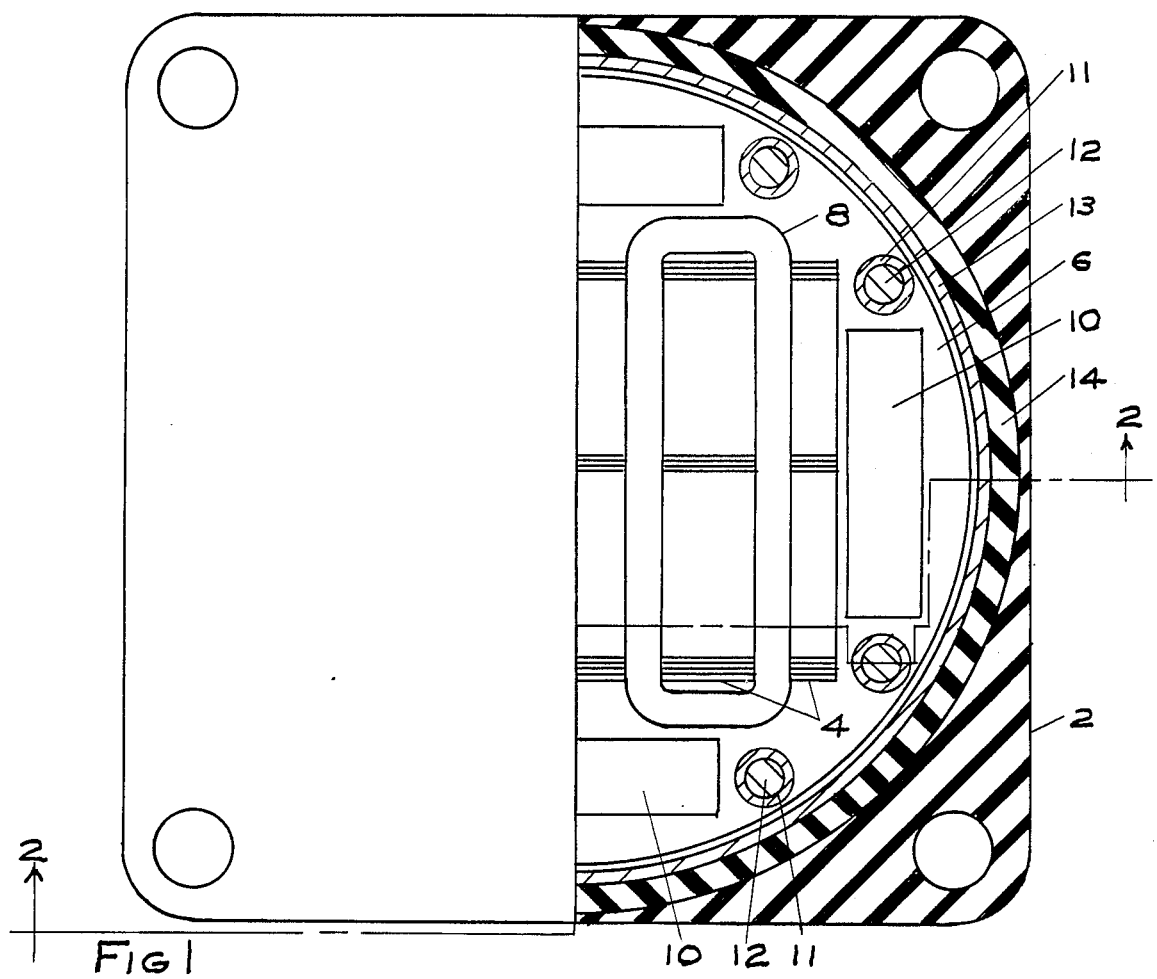
FIG. 1 is a partial cut-away plan view of the transducer incorporating one preferred form of construction to illustrate the teachings of this invention.
Figure 2:
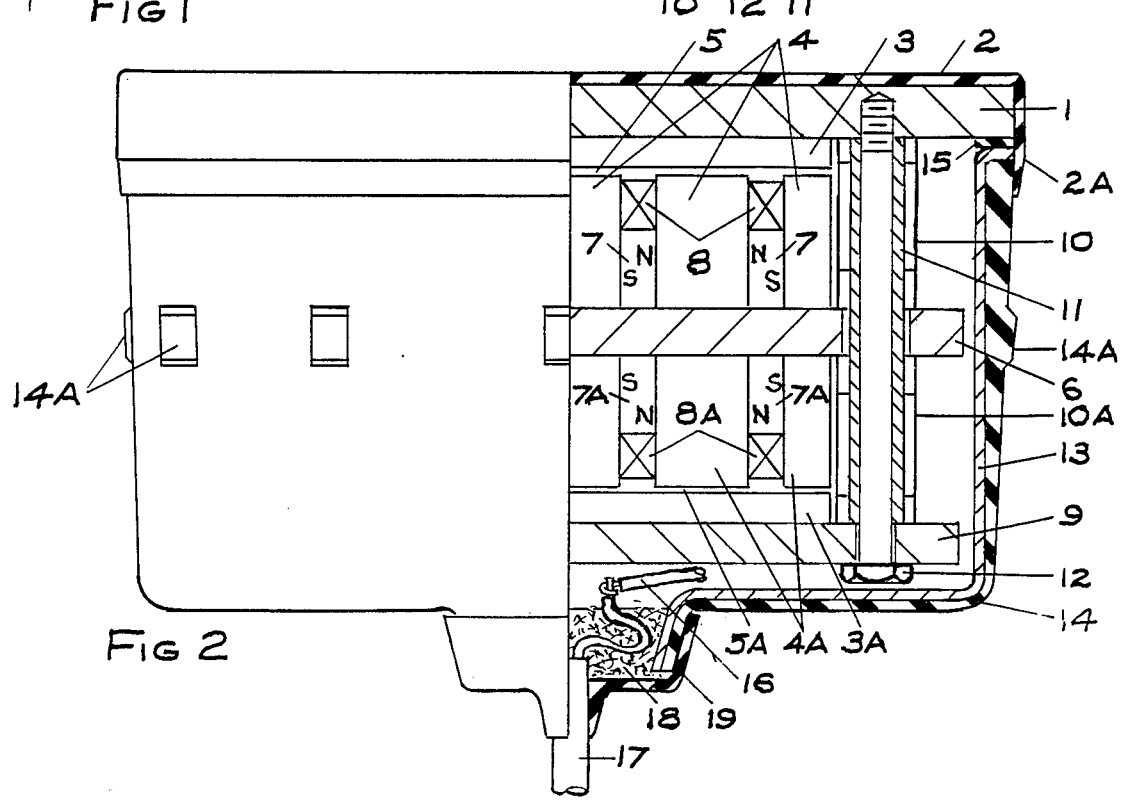
FIG. 2 is a section taken along the line 2—2 of FIG. 1.

Referring more specifically to the figures, the reference character 1 represents a vibratile plate such as an aluminum piston on whose outer surface is molded an elastomer waterproof cap 2 as shown illustrated in FIG. 2. Although the vibratile piston 1 is illustrated in the drawings as a circular disc, it could be of any other shape such as square or hexagonal. A stack of I-shaped laminations 3 is bonded to the inner plane surface of the piston 1 using a suitable metal bonding agent well known in the art such as epoxy. The free unbonded inner plane surface of the lamination stack 3 is accurately spaced from the unbonded free plane surfaces of the lamination stacks 4 to form a uniform air gap 5. The flat base surfaces of the lamination stacks 4 are securely bonded to the flat mating surface of the non-magnetic base member 6 as illustrated. A non-magnetic base plate 6 is used otherwise the permanent magnets 7 which supply the magnetic biasing flux in the air gap would be short circuited. If desired, the biasing flux may be supplied by a dc polarizing current sent through the drive coils 8 in which case the permanent magnets would be eliminated and would be replaced by magnetic lamination material which would become an extension of the vertical lamination stacks 4 to form a conventional E-shaped lamination stack which is well known in the art and is illustrated in FIG. 1 of either of the referenced copending Applications.

The choice of permanent magnets 7 for supplying the magnetic air gap bias flux, as illustrated, will improve the efficiency of the transducer by eliminating the need for dc power for supplying the air gap magnetic bias flux. The use of permanent magnets will also permit a higher power output rating for the transducer because the heat losses that would be generated in the coils with dc polarization are eliminated.

The permanent magnets 7 may preferably be either the well known barium carbonate iron oxide magnets such as INDOX or the equally well known cobalt rare earth magnets such as INCOR which are trade names of suitable magnets as manufactured by Indiana General, Valparaiso, Ind. The magnets 7 are cemented between the vertical walls of the lamination stacks 4 with the magnets' north pole (N) and south pole (S) faces oriented as illustrated. The magnet and lamination stack assembly just described is cemented to the top flat surface of the non-magnetic plate member 6 as shown in FIG. 2, using any suitable adhesive such as epoxy. The spaces remaining between the lamination stacks above the tops of the magnets 7 provide slots into which a rectangularshaped coil of insulated copper wire 8 is inserted within each pair of slots in the stack assembly 4 as illustrated. The coils are potted securely within the slots with any suitable potting compound well known in the art, such as epoxy, to insure that the coils become a rigid part of the electromagnetic assembly.

The remainder of the transducer assembly is illustrated in the partial cross-sectional view of FIG. 2. A mirror image of the magnetic assembly just described is attached to the opposite bottom face of the non-magnetic plate member 6. The identical mirror image of the magnetic assembly is illustrated by the vertical lamination stacks 4A; the magnets 7A; the coils 8A and the I-lamination stack 3A. The duplicate I-lamination stack assembly 3A is securely bonded to the flat surface of the plate member 9 using the same adhesive used for bonding the I-lamination stack 3 to the surface of the vibratile piston 1 as previously described.

Identical springs 10 and 10A are attached between the opposite flat peripheral surfaces of the plate member 6 and the mating surfaces of the piston 1 and plate member 9 as illustrated in FIG. 2. Any suitable fastening means may be used to fasten the springs such as bolts installed through clearance holes in the flanged ends of the springs (not shown) and screwed into tapped holes located in the piston 1 and plate member 9 (not shown). The heights of the springs are precisely ground to achieve the desired identical air gaps 5 and 5A. In order to insure that the alternating magnetic forces generated by the alternating current supplied to the coils 8 and 8A, located on opposite sides of the common base plate member 6, are totally and exactly combined throughout the frequency range of operation of the transducer and that a single common resonance frequency is maintained for the single vibratile piston when driven by the two separate electromagnetic assemblies just described, a very special and unique electromechanical construction is necessary. The electrical phase of the alternating ac flux in the air gap 5 during operation must be shifted 180° from the alternating flux in air gap 5A. For the polarity of the magnets arranged as indicated in FIG. 2 this means that the ac current through the coils 8 are to be connected out-of-phase with the ac current through the coils 8A so that the flux density in air gap 5 increases during the half cycle period that the flux density in air gap 5A decreases. During the remaining half cycle of vibration, the flux density of air gap 5 decreases while the flux density in air gap 5A increases.

In order that the instantaneous electromagnetic alternating force generated in air gap 5 is added directly to the instantaneous electromagnetic force generated in air gap 5A, a rigid mechanical connection is required between the plate 9 and the piston 1. A suitable rigid mechanical connection to meet the basic design requirement is illustrated in the drawings by a plurality of peripherally located rigid tubular spacers 11 of equal precise length to maintain the exact desired dimensions of air gaps 5 and 5A. The tubular spacers pass through clearance holes in plate 6 and are held securely in place by the bolts 12, thus rigidly attaching plate 9 to the vibratile piston 1 and insuring that the combined electromagnetic forces generated in air gaps 5 and 5A are instantaneously additive in driving the piston 1 over the entire operative frequency range, thus achieving the stated major objects of this invention.

To complete the structural assembly of the disclosed novel transducer, a metallic rear housing 13 is preferably covered with a molded elastomer 14 such as neoprene. Tapered wedges 14A are molded around the periphery of the neoprene covering 14 as illustrated, to serve as shock mounts when the transducer is mounted into an array frame. The tapered rubber wedges 14A will provide an interference fit between the rubber covered transducer housing and the hole diameter provided in the mounting frame structure to locate the transducer. The interference fit of the tapered rubber shock mounts will also provide mechanical damping for the array frame and thus prevent ringing of the frame structure when high-power acoustic signals are transmitted from the transducer elements during operation.

A peripheral rubber gasket 15 which may be a separate rubber washer, or it can be an integral part of the inner surface of the molded rubber cap structure 2, is cemented with a suitable rubber-to-metal cement well known in the art between the open peripheral flanged end of the housing 13 and the inner peripheral plane surface of the piston 1. The thickness of the rubber gasket 15 is chosen such that the compliance of the gasket in combination with the mass of the housing 13 resonates at a frequency below the operating frequency of the transducer and preferably approximately an octave or more below the operating frequency of the transducer. This will insure that the rear housing will become effectively uncoupled from the vibrating piston during the operation of the transducer thus preventing the transducer housing 13 from radiating undesireable amounts of acoustic energy and thereby preventing the transducer from behaving as a dipole over its operating frequency range.

The elastomer rubber cap 2 which is molded to the radiating surface of the piston 1 is provided with an overhanging cylindrical skirt portion 2A which at final assembly is stretched over the periphery of the rubber covering 14 which is molded over the outer surface of the housing member 13. Before stretching the skirt portion 2A over the mating rubber surface 14 the mating surfaces are preferably coated with a suitable waterproof rubber cement, as is well known in the art, to insure a permanent waterproof seal at the overlapping joint.

For the design illustrated in the drawings two coils 8 are assembled, one coil in each pair of the four slots shown in the magnetic structure on the top side of the base plate 6, and two identical additional coils 8A are assembled in the four slots shown in the magnetic structure attached on the bottom of the base plate 6 as illustrated in FIG. 2. The magnetic lamination assembly 4A, permanent magnets 7A, and coils 8A mounted on the bottom side of base plate 6 are identical to the assembled magnetic structure mounted on the top side of the base plate 6. A stack of I-laminations 3A, which is identical to I-lamination stack 3, is bonded to a rigid lightweight plate 9 as shown.

Although a total of 4 coils has been used in the illustrative design, it is obvious that any other number of coils could be used without changing the fundamental principal of operation of the transducer. The four coils 8 and 8A may be connected in series or parallel as desired to best suit the impedance requirement of the transducer assembly. The electrical connections to the coils 8 and 8A are brought out through insulated conductors 16 as schematically illustrated in FIG. 2. The conductors from an external waterproof cable 17 are soldered or otherwise suitably connected to the conductors 16 and the terminal compartment is sealed with a suitable potting compound 18 as illustrated. After potting, the rubber cap 19 is stretched over the molded rubber surface 14 of the housing structure as shown in FIG. 2. Rubber cement is applied between the mating rubber surfaces in the same manner as described for sealing the rubber skirt portion 2A to the outer periphery of rubber covering 14.

The specific design of the inventive transducer that has been described was chosen for illustrating the basic principals of the new electromechanical dual air gap electromagnetic force generating system that is disclosed for driving a single vibratile piston to achieve the stated objects of the invention. It should be understood, however, that various modifications and alternative constructions may be made without departing from the true spirit and scope of the invention. Therefore, the appended claims are intended to cover all such equivalent alternative constructions that fall within their true spirit and scope as listed in the following claims.

I claim:

1. In combination in an electromagnetic transducer assembly designed for efficient underwater generation of high power acoustic energy densities in excess of approximately 25 peak Watts per square inch of radiating surface when operating at a mid-audible frequency located within the approximate range 500 Hz to 2500 Hz under conditions of 100% rho-c loading, a vibratile plate having an outer surface adapted for transmitting oscillatory mechanical vibrations into the water when the transducer is immersed therein, said vibratile plate also having a flat inner plane surface, a first magnetic flux conducting structure having a specified thickness defined by two parallel plane surfaces, means for rigidly attaching the first one of said two parallel plane surfaces of said first magnetic flux conducting structure to the said flat inner plane surface of said vibratile plate, a first plate member characterized in that it has two parallel plane surfaces, a second magnetic flux conducting structure having a specified thickness defined by two parallel plane surfaces, means for rigidly attaching the first one of said two parallel surfaces of said second magnetic flux conducting structure to the first one of said two parallel surfaces of said first plate member, said second parallel surface of said second magnetic flux conducting structure characterized in that one or more pairs of slots are provided into the said second parallel plane surface of said second magnetic flux conducting structure, a plurality of coils wound with insulated electrical conductors and dimensioned to fit with adequate clearance within said plurality of pairs of slots provided into the said second parallel plane surface of said second magnetic flux conducting structure, rigid potting means filling said clearance space between said coils and said slots, a plurality of spring members characterized in that their overall length dimensions are precisely machined to a uniform specified height, first fastening means for attaching one end of said spring members to the inner plane surface of said vibratile plate, second fastening means for attaching the opposite end of said spring members to the said first parallel surface of said first plate member, the uniform specified height of said plurality of spring members and the precise location of the springs on the facing flat surfaces of said vibratile plate and said first plate member establish a specified uniform air-gap dimension between said first and said second magnetic flux conducting structure, a second plate member characterized in that it has at least one flat plane surface, and also characterized in that the area of said second plate member is comparable to the area of said first plate member, a third magnetic flux conducting structure which is a functional duplicate of said first magnetic flux conducting structure, means for rigidly attaching the first one of said two parallel surfaces of said third flux conducting structure to the flat plane surface of said second plate member, a fourth magnetic flux conducting structure which is a functional duplicate of said second magnetic flux conducting structure, means for rigidly attaching said first one of said two parallel surfaces of said fourth magnetic flux conducting structure to the second one of said two parallel plane surfaces of said first plate member, a second functional duplicate set of coils wound with insulated electrical conductors fitted and potted into the corresponding slots provided in said fourth magnetic flux conducting structure, a second plurality of functionally identical spring members rigidly attached between the facing flat surfaces of said first and said second plate members, the uniform specified height of said second plurality of said spring members and their precise location on the facing peripheral flat surfaces of said first and said second plate members establish the same specified uniform air gap as established by the same springs mounted between said first and said second magnetic flux conducting structures, a plurality of rigid post-like spacing members of uniform precise specified length dimension and having parallel flat end surfaces, rigid fastening means for mounting said plurality of post-like spacing members between the facing flat surfaces of said vibratile piston and said second plate member whereby the instantaneous alternating magnetic forces generated in each of the dual air gaps are added in phase when alternating electrical current is supplied to all of the coils, means for providing dc magnetic polarizing flux in each of the dual air gaps, a waterproof housing structure for enclosing said electromagnetic transducer assembly, sealed insulated terminal means associated with said housing structure for establishing external electrical connection through the transducer housing to said enclosed electromagnetic transducer assembly, electrical connection means from said plurality of coils to said terminal means, and means for generating controlled equal electromagnetic forces in each of the dual magnetic air gaps by supplying controlled electrical power to said electrical terminal means.

2. The invention in claim 1 characterized in that said means for providing dc magnetic polarizing flux in each of the dual air gaps includes permanent magnets.

3. The invention in claim 1 characterized in that said supplied electrical power includes a dc component of current for establishing a fixed flux density in said air gaps and an ac component of current for modulating said fixed flux density at the frequency corresponding to the frequency of said ac component of current whereby corresponding ac magnetic forces are generated in the air gaps and are transferred to said vibratile plate.

4. The invention in claim 1 characterized in that at least a portion of said magnetic flux conducting structures include laminations made of a magnetic alloy containing approximately 49% Cobalt, 49% Iron and 2% Vanadium.

5. The invention in claim 4 further characterized in that the peak flux density in the air gaps at maximum full-power operation of the transducer is in the vicinity of or greater than 17,000 gausses.

6. The invention in claim 1 characterized in that said first and said third magnetic flux conducting structures comprise an assembly of laminations made of a magnetic alloy containing approximately 49% Cobalt, 49% Iron and 2% Vanadium.

7. The invention in claim 6 further characterized in that the peak flux density in the air gaps at maximum full-power operation of the transducer is in the vicinity of or greater than 17,000 gausses.

8. The invention in claim 1 characterized in that the peak flux density in the air gaps at maximum full-power operation of the transducer is in the vicinity of or greater than 17,000 gausses.

9. In combination in an electromagnetic transducer assembly designed for efficient underwater generation of high-power acoustic energy densities in excess of approximately 25 peak Watts per square inch of radiating surface when operating at a mid-audible frequency located within the approximate range 500 Hz to 2500 Hz under conditions of 100% rho-c loading, a vibratile circular plate having an outer surface adapted for transmitting oscillatory mechanical vibrations into the water when the transducer is immersed therein, said vibratile circular plate also having an inner plane surface, a first magnetic flux conducting structure having a specified thickness defined by two parallel plane surfaces, means for rigidly attaching the first one of said two parallel plane surfaces of said first magnetic flux conducting structure to the said inner plane surface of said vibratile plate, a first plate member characterized in that it has two parallel plane surfaces, a second magnetic flux conducting structure having a specified thickness defined by two parallel plane surfaces, means for rigidly attaching the first one of said two parallel surfaces of said second magnetic flux conducting structure to the first one of said two parallel surfaces of said first plate member, said second parallel surface of said second magnetic flux conducting structure characterized in that one or more pairs of slots are provided into the said second parallel plane surface of said second magnetic flux conducting structure, a plurality of coils wound with insulated electrical conductors and dimensioned to fit with adequate clearance within said plurality of pairs of slots provided into the said second parallel plane surface of said second magnetic flux conducting structure, a rigid potting means filling said clearance space between said coils and said slots, a plurality of spring members characterized in that their overall length dimensions are precisely machined to a uniform specified height, first fastening means for attaching one end of said spring members to the inner plane surface of said vibratile plate, second fastening means for attaching the opposite end of said spring members to the said first parallel surface of said first plate member, the uniform specified height of said plurality of spring members and the location of the springs on the facing flat surfaces of said vibratile plate and said first plate member establish a specified uniform air-gap dimension between said first and said second magnetic flux conducting structures, a second plate member characterized in that it has at least one flat plane surface, and also characterized in that the area of said second plate member is comparable to the area of said first plate member, a third magnetic flux conducting structure which is a functional duplicate of said first magnetic flux conducting structure, means for rigidly attaching the first one of said two parallel surfaces of said third flux conducting structure to the flat plane surface of said second plate member, a fourth magnetic flux conducting structure which is a functional duplicate of said second magnetic flux conducting structure, means for rigidly attaching said first one of said two parallel surfaces of said fourth magnetic flux conducting structure to the second one of said two parallel plane surfaces of said first plate member, a second functional duplicate set of coils wound with insulated electrical conductors fitted and potted into the corresponding slots provided in said fourth magnetic flux conducting structure, a second plurality of functionally identical spring members rigidly attached between the facing flat surfaces of said first and said second plate members, the uniform specified height of said second plurality of said spring members and their precise location on the facing peripheral flat surfaces of said first and said second plate members establish the same specified uniform air gap as established by the same springs mounted between said first and said second magnetic flux conducting structures, a plurality of rigid post-like spacing members of uniform precise specified length dimension and having parallel flat end surfaces, rigid fastening means for mounting said plurality of post-like spacing members between the facing flat surfaces of said vibratile piston and said second plate member whereby the instantaneous alternating magnetic forces generated in each of the dual air gaps are added in phase when alternating electrical current is supplied to all of the coils, means for providing dc magnetic polarizing flux in each of the dual air gaps, a water-proof housing structure for enclosing said electromagnetic transducer assembly, said housing structure having an annular flat surface at its open end, the outside diameter of said annular surface is approximately equal to the diameter of said vibratile plate, a waterproof elastomer covering bonded to said outer surface of said vibratile circular plate, said elastomer covering including a thin circular peripheral skirt portion extending axially and surrounding the outer peripheral edge of said vibratile circular plate, an annular flexible flat gasket having an external diameter approximately equal to the diameter of said vibratile circular plate and an internal diameter approximately equal to the inner diameter of the open end of said housing structure said flat gasket located between the periphery of the inner plane surface of said vibratile circular plate and the annular flat surface at the open end of said housing structure, sealed insulated terminal means associated with said housing structure for establishing external electrical connection through the transducer housing to said enclosed electromagnetic transducer assembly, electrical connection means from said plurality of coils to said terminal means, and means for generating controlled equal electromagnetic forces in each of the dual magnetic air gaps by supplying controlled electrical power to said electrical terminal means.

10. The invention in claim 9 characterized in that said annular flexible gasket is an integral portion of said elastomer covering bonded to the outer surface of said vibratile circular plate.

11. The invention in claim 9 characterized in that said housing structure includes an elastomer covering bonded to its outer surface.

12. The invention in claim 11 further characterized in that said annular flat flexible gasket is an integral portion of said elastomer covering bonded to the outer surface of said housing structure.

13. The invention in claim 11 further characterized in that a plurality of tapered projections are spaced around the circumference of the elastomer covering which is bonded to the outer surface of said housing structure.

14. The invention in claim 9 characterized in that the compliance of said annular gasket is sufficiently high to insure that the resonance frequency of said outer housing structure in combination with the compliance of said annular gasket occurs below the operating frequency of the transducer.

15. The invention in claim 14 further characterized in that said resonance frequency is at least an octave below the operating frequency of the transducer.

16. The invention in claim 1 characterized in that the combined weight of said first plate member plus said second and fourth magnetic flux conducting structures attached thereto is greater than three times the weight of said vibratile plate member in combination with the first magnetic flux conducting structure attached thereto plus the weight of said second plate member in combination with the said third magnetic flux conducting structure attached thereto.

17. The invention in claim 16 further characterized in that the weight of the first listed group of components is at least five times the weight of the second listed group of components.

18. In combination in an electromagnetic transducer, a vibratile plate having an outer surface adapted for transmitting oscillatory mechanical vibrations into a sound transmitting medium and an inner surface adapted to be driven by an oscillatory mechanical force, a dual electromagnetic force generating means comprising two independent separate electromagnetic air gaps, means for producing a dc bias flux in each of said dual air gaps, means for modulating said dc bias fluxes, said flux modulating means including a separate alternating current generated magnetic field superimposed on each of said dc biased magnetic fields, means for controlling said alternating magnetic fields by controlling the ac current supplied to said ac magnetic field generators, and rigid mechanical coupling means between the combined ac electromagnetic forces generated in both air gaps and the inner surface of said vibratile plate.

* * * * *